(12) United States Patent
Kraska et al.

(10) Patent No.: US 6,600,980 B1
(45) Date of Patent: Jul. 29, 2003

(54) TORQUE REVERSAL REDUCTION STRATEGY FOR A HYBRID VEHICLE

(75) Inventors: Marvin Paul Kraska, Dearborn, MI (US); Thomas Lee DeMurry, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 10/065,216

(22) Filed: Sep. 26, 2002

(51) Int. Cl.[7] ................................................. B60L 11/00
(52) U.S. Cl. ................................ 701/22; 701/51; 477/2
(58) Field of Search ......................... 477/15, 2, 5, 3, 477/4, 166; 701/1, 22, 36, 51, 53, 54, 55, 61; 180/65.1–65.6; 192/85 AA, 86, 103 R

(56) References Cited

U.S. PATENT DOCUMENTS

| 5,343,970 | A | | 9/1994 | Severinsky |
| 5,596,495 | A | | 1/1997 | Brown et al. |
| 5,928,301 | A | * | 7/1999 | Soga et al. ................... 701/51 |
| 5,979,257 | A | | 11/1999 | Lawrie |
| 6,090,007 | A | * | 7/2000 | Nakajima et al. ............. 477/46 |
| 6,102,144 | A | * | 8/2000 | Lutz ........................... 180/65.2 |
| 6,175,785 | B1 | | 1/2001 | Fujisawa et al. |
| 6,176,808 | B1 | | 1/2001 | Brown et al. |

* cited by examiner

*Primary Examiner*—Richard M. Camby
(74) *Attorney, Agent, or Firm*—Carlos L. Hanze

(57) ABSTRACT

This invention provides a strategy and system for an hybrid electric vehicle (HEV) that is not equipped with a hydraulic torque converter wherein a generator motor is utilized to maintain engine rotational velocity during up-shifting of the vehicle transmission in situations where the throttle of the engine is released. This invention can reduce undesirable torque reversals during up-shifting of the vehicle transmission in such situations where the throttle of the engine is released. A controller is adapted to control the generator is supplied with data output by detectors that monitor the rotational velocity of said engine and the gear ratio of the transmission. The controller is programmed to command the generator to maintain the rotational velocity of said engine above a preselected threshold during up-shifting of the transmission.

14 Claims, 3 Drawing Sheets

TORQUE REVERSAL REDUCTION STRATEGY FOR A HYBRID VEHICLE

FIELD OF INVENTION

The present invention relates generally to an hybrid electric vehicle (HEV), and specifically reducing torque reversals during throttle back-out transmission up-shifts in an HEV.

BACKGROUND OF INVENTION

The need to reduce fossil fuel consumption and emissions in automobiles and other vehicles predominately powered by internal combustion engines (ICEs) is well known. Vehicles powered by electric motors attempt to address these needs. Another alternative solution is to combine a smaller ICE with electric motors into one vehicle. Such vehicles combine the advantages of an ICE vehicle and an electric vehicle and are typically called hybrid electric vehicles (HEVs). See generally, U.S. Pat. No. 5,343,970 to Severinsky.

The HEV is described in a variety of configurations. Many HEV patents disclose systems where an operator is required to select between electric and internal combustion operation. In other configurations, the electric motor drives one set of wheels and the ICE drives a different set.

Other, more useful, configurations have developed. For example, a series hybrid electric vehicle (SHEV) configuration is a vehicle with an engine (most typically an ICE) connected to an electric motor called a generator. The generator, in turn, provides electricity to a battery and another motor, called a traction motor. In the SHEV, the traction motor is the sole source of wheel torque. There is no mechanical connection between the engine and the drive wheels. A parallel hybrid electrical vehicle (PHEV) configuration has an engine (most typically an ICE) and an electric motor that work together in varying degrees to provide the necessary wheel torque to drive the vehicle. Additionally, in the PHEV configuration, the motor can be used as a generator to charge the battery from the power produced by the ICE.

A parallel/series hybrid electric vehicle (PSHEV) has characteristics of both PHEV and SHEV configurations and is sometimes referred to as a parallel/series "split" configuration. In one of several types of PSHEV configurations, the ICE is mechanically coupled to two electric motors in a planetary gear-set transaxle. A first electric motor, a generator, is connected to a sun gear. The ICE is connected to a carrier. A second electric motor, a traction motor, is connected to a ring (output) gear via additional gearing in a transaxle. Engine torque can power the generator to charge a battery. The generator can also contribute to the necessary wheel (output shaft) torque if the system has a one-way clutch. The traction motor is used to contribute wheel torque and to recover braking energy to charge the battery. In this configuration, the generator can selectively provide a reaction torque that may be used to control engine speed. In fact, the engine, generator motor and traction motor can provide a continuous variable transmission (CVT) effect. Further, the HEV presents an opportunity to better control engine idle speed over conventional vehicles by using the generator to control engine speed.

In each of the HEV powertrain configurations described above, the generator motor can be used as the starter motor for the ICE. When the generator motor performs this combined function, the generator can be referred to as a combined starter/alternator (S/A) or an integrated starter/generator (ISG).

The desirability of combining an ICE with electric motors is clear. There is great potential for reducing vehicle fuel consumption and emissions with no appreciable loss of vehicle performance or driveability. The HEV allows the use of smaller engines, regenerative braking, electric boost, and even operating the vehicle with the engine shutdown. Nevertheless, new ways must be developed to optimize the HEV's potential benefits.

One such area of HEV development is improving vehicle driveability, specifically improving the response of the HEV to changes in throttle position, particularly, throttle back-outs. A throttle back-out occurs when the throttle is released from an open position to a closed position. Throttle position is typically measured in a percentage, where 100% throttle represents a wide-open throttle and 0% throttle represents a closed throttle. During a throttle back-out, the vehicle transmission may need to up-shift, i.e., shift to a higher gear, so as to not provide an undesirable amount of negative torque to the vehicle.

While most HEVs include a transmission, either manual or automatic, in the driveline, many HEVs do not have a hydraulic torque converter between the engine and the transmission. In these HEVs, the clutches and gears between the engine, traction motor, generator motor and transmission must perform the function of the conventional hydraulic torque converter to not only transfer torque through the driveline, but also provide a measure of damping during gear shifts.

Gearshift control of transmissions and transmission controls in an HEV are known in the art. Brown et al., U.S. Pat. No. 5,596,495, discloses a system for controlling a downshift in an automatic transmission having a torque converter. Brown et al., U.S. Pat. No. 6,176,808 discloses a hybrid vehicle powertrain and controller. The 808 patent discloses a powertrain assembly for an automotive vehicle having an internal combustion engine and transmission for delivering engine torque to traction wheels of a vehicle. An electric induction motor is situated in the torque flow path between the engine and the transmission. The induction motor supplements engine torque, permitting the engine to be turned off when the vehicle is at rest, thereby improving fuel economy and reducing undesirable exhaust gas emissions from the engine. Here, torque multiplication that would normally be available from the hydrokinetic torque converter in the transmission is essentially replaced by the induction motor during vehicle startup. A vibration damping function of the hydrokinetic torque converter during engine idle is also performed by the induction motor, again eliminating the need for a hydrokinetic torque converter. The induction motor, during operating modes where induction motor torque is not required, functions as an alternator during periods of regenerative braking, when the internal combustion engine is inactive and when the vehicle is in coast mode.

Fujisawa et al., U.S. Pat. No. 6,175,785, discloses a hybrid vehicle that is driven by either an engine or a motor by tightening or releasing a clutch interposed between an engine and a transmission. A generator is connected to the engine, and engine torque is absorbed by the generator when the power source is changed over from the motor to the engine. The clutch is tightened when the rotational speed of the motor and the engine coincide. As a result, the torque input to the transmission is maintained constant, and shock due to changeover of the power source is suppressed.

Lawrie, U.S. Pat. No. 5,979,257, discloses a powertrain system for a hybrid vehicle that includes an engine and an electric machine, which operates as both an electric motor and an alternator, to power the vehicle. The hybrid vehicle also includes a manual-style transmission configured to operate as an automatic transmission from the perspective of the driver. The engine and the electric machine drive an input shaft, which in turn drives an output shaft of the transmission. In addition to driving the transmission, the electric machine regulates the speed of the input shaft in order to synchronize the input shaft during either an up-shift or down-shift of the transmission by either decreasing or increasing the speed of the input shaft. When decreasing the speed of the input shaft, the electric motor functions as an alternator to produce electrical energy, which may be stored by a storage device. Operation of the transmission is controlled by a transmission controller that receives input signals and generates output signals to control shift and clutch motors to effect smooth launch, up-shifts and down-shifts of the transmission, so that the transmission functions substantially as an automatic transmission from the perspective of the driver, while internally substantially functioning as a manual transmission.

While HEV controls are known in the art, none are known that can reduce torque reversals during throttle back-out transmission up-shifts.

SUMMARY OF INVENTION

Accordingly, the present invention provides a strategy that uses a generator motor to reduce torque reversals during throttle back-out transmission up-shifts in an hybrid electric vehicle (HEV).

One aspect of the invention is the use of a generator motor to maintain engine speed to prevent torque reversal, i.e., driving of the engine by the transmission, during up-shifts of the transmission when the throttle is being released. A related aspect relates to determination, using a controller, of the engine speed at the time the transmission shift is being entered. The controller commands the generator motor to hold this engine speed for a time sufficient to enable the shift to occur, thus avoiding disagreeable negative torque and vehicle deceleration. In accordance with a further related aspect of the invention, the generator motor is operated in a closed-loop control mode resulting in abatement of negative torque and enabling smooth shifting. The generator motor can also operate in an open-loop control mode, also resulting in abatement of negative torque and enabling smooth shifting. Open-loop control can use look up tables or other control methods known in the art.

Briefly, the invention provides a strategy and system for an hybrid electric vehicle (HEV) that is not equipped with a hydraulic torque converter wherein a generator motor is utilized to maintain engine rotational velocity during up-shifting of the vehicle especially in situations where the throttle of the engine is quickly released. A controller adapted to control the generator motor is supplied with data output by detectors that monitor the rotational velocity of the engine and the gear ratio of the transmission. The controller is programmed to command the generator motor to maintain the rotational velocity of the engine above a preselected threshold during up-shifting of the transmission.

Other features and advantages of the present invention will become more apparent to persons having ordinary skill in the art to which the present invention pertains from the following description taken in conjunction with the accompanying figures.

BRIEF DESCRIPTION OF DRAWINGS

The foregoing advantages and features, as well as other advantages and features, will become apparent with reference to the description and figures below, in which like numerals represent like elements and in which.

DETAILED DESCRIPTION

Figure 1:
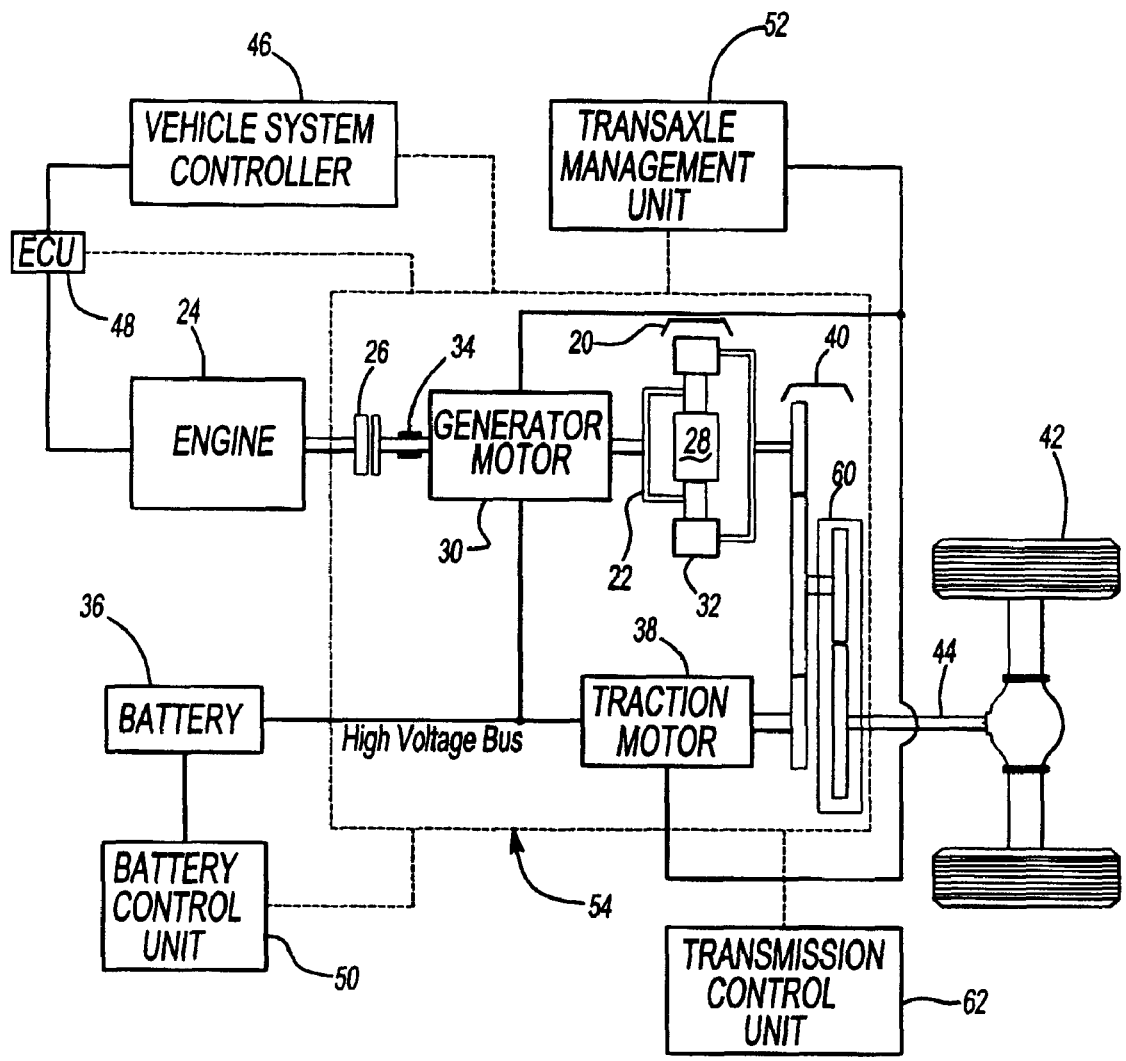
FIG. 1 illustrates a general hybrid electric vehicle (HEV) configuration.

The present invention relates to electric vehicles and, more particularly, hybrid electric vehicles (HEVs). FIG. 1 demonstrates just one possible configuration, specifically a parallel/series hybrid electric vehicle in a "split" configuration.

In a basic HEV, a planetary gear set 20 mechanically couples a carrier gear 22 to an engine 24 via a one-way clutch 26. The planetary gear set 20 also mechanically couples a sun gear 28 to a generator motor 30 and a ring (output) gear 32. The generator motor 30 can act to start the engine 24, acting as a combined starter/alternator. The generator motor 30 also mechanically links to a generator brake 34 and is electrically linked to a battery 36. A traction motor 38 is mechanically coupled to the ring gear 32 of the planetary gear set 20 via a second gear set 40 and is electrically linked to the battery 36. The ring gear 32 of the planetary gear set 20 and the traction motor 38 are mechanically coupled to drive wheels 42 via an output shaft 44.

The second gear set 40 can include a transmission 60. The transmission 60 can have a plurality of gear ratios that are selectively controlled by a transmission control unit (TCU) 62. A gear ratio shift in an automatic transmission generally has two phases, a torque transfer phase and a speed ratio phase. During the torque transfer phase, the engine 24 torque is matched to transmission 60 torque at the new gear ratio. Following the torque transfer phase, the engine 24 speed is allowed to adjust to match the transmission 60 speed. This speed matching is the speed ratio phase.

The planetary gear set 20, splits the engine 24 output energy into a series path from the engine 24 to the generator motor 30 and a parallel path from the engine 24 to the drive wheels 42. Engine 24 speed can be controlled by varying the split to the series path while maintaining the mechanical connection through the parallel path. The traction motor 38 augments the engine 24 power to the drive wheels 42 on the parallel path through the second gear set 40. The traction motor 38 also provides the opportunity to use energy directly from the series path, essentially running off power created by the generator motor 30. This reduces losses associated with converting energy into and out of chemical energy in the battery 36 and allows all engine 24 energy, minus conversion losses, to reach the drive wheels 42.

A vehicle system controller (VSC) 46 controls many components in this HEV configuration by connecting to each component's controller. An engine control unit (ECU) 48 connects to the engine 24 via a hardwire interface. All vehicle controllers can be physically combined in any combination or can stand as separate units. They are described as separate units here because they each have distinct functionality. The VSC 46 communicates with the ECU 48, TCU 62, as well as a battery control unit (BCU) 50 and a transaxle management unit (TMU) 52 through a communication network, such as a controller area network (CAN) 54. The BCU 50 connects to the battery 36 via a hardwire interface. The TMU 52 controls the generator motor 30 and traction motor 38 via a hardwire interface.

The control units 46, 48, 50, 52 and 62, and controller area network 54 can include one or more microprocessors, computers, or central processing units; one or more computer readable storage devices; one or more memory management units; and one or more input/output devices for communicating with various sensors, actuators and control circuits. The strategies of the present invention can be embodied in a computer readable format programmed in one or more of the computing devices described above.

Figure 2:
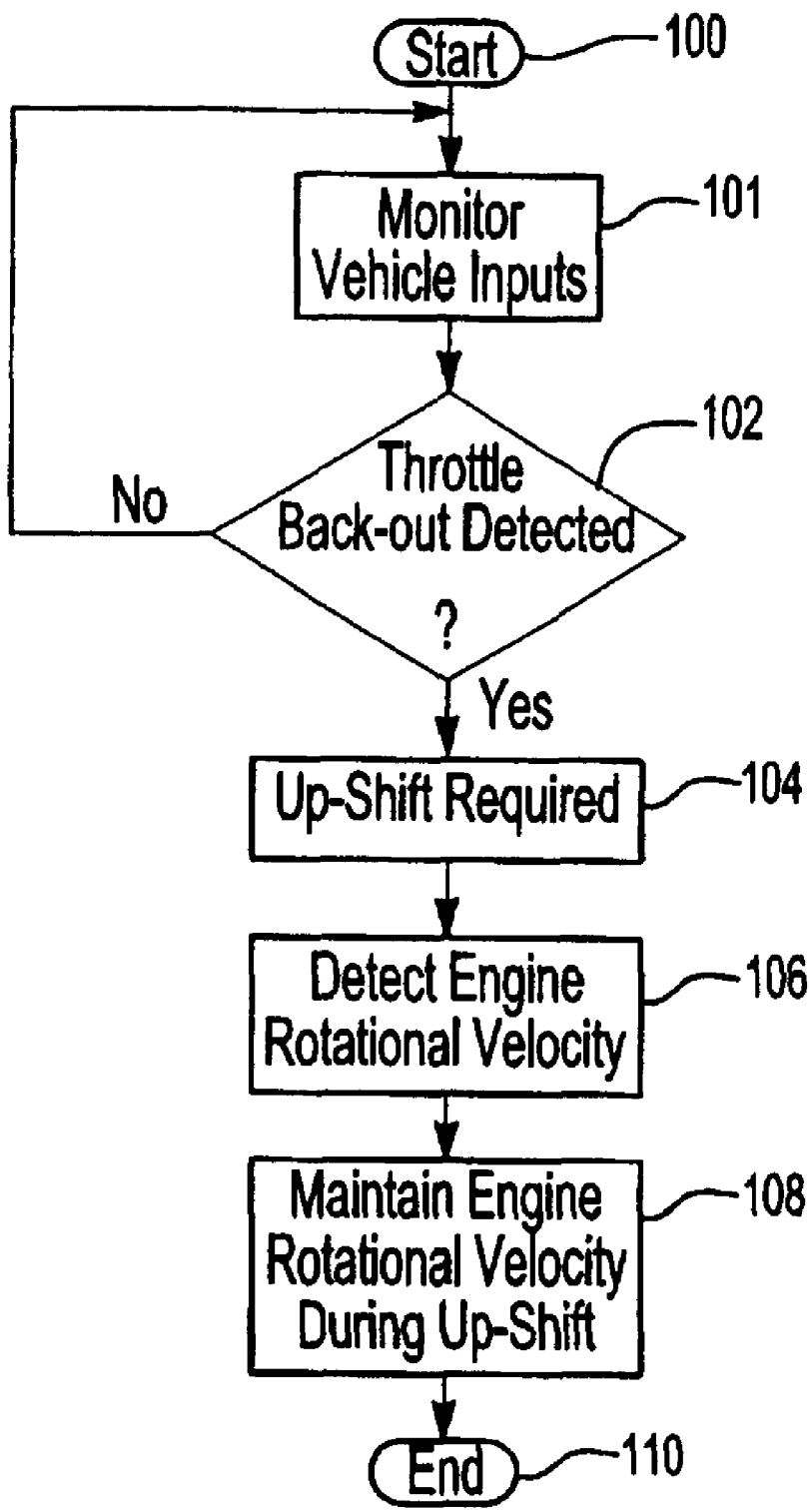
FIG. 2 illustrates a strategy for using a generator during throttle back-out transmission up-shifts to reduce torque reversals for an HEV.

FIG. 2 illustrates a strategy for using a generator during throttle back-out transmission up-shifts to reduce torque reversals for an HEV. The strategy starts at step 100 and proceeds to step 101, where the strategy monitors vehicle system inputs. Vehicle system inputs can include throttle position, vehicle speed, transmission 60 gear ratio, engine 24 rotational velocity and generator motor 30 rotational velocity.

Following step 101, the strategy proceeds to step 102, where the strategy determines whether a throttle back-out condition exists. This determination can be based on the rate of change of the throttle position. If no, the strategy returns to step 100. If yes, the strategy proceeds to step 104, where the TCU 62 indicates that an up-shift is required. Following, step 104, the strategy proceeds to step 106. At step 106, a rotational velocity of the engine 24 is detected. Following step 106, the strategy proceeds to step 108.

At step 108, the generator motor 30 acts to maintain engine 24 rotational velocity at a preselected threshold above the detected engine 24 rotational velocity during the transmission 60 up-shift. The preselected threshold can be selected based on the rotational-velocity of the engine 24 and the gear ratio of the transmission 60. The generator motor 30 receives a generator motor 30 speed control command to maintain engine 24 rotational velocity at the preselected threshold during the torque phase of the transmission 60 up-shift.

The generator motor 30 can be operated in either a closed-loop control mode or an open-loop control mode. In open-loop control, a sequence of commands is carried out irrespective of the consequences. The magnitude of the control, i.e., the amount of adjustment applied to the system, can be based on a set of operating conditions. In contrast, closed-loop control involves the use of feedback to help insure a desired set of conditions is met. The magnitude of the control can be based on the difference between the feedback signal and the desired condition.

For the present invention, closed-loop control allows sensing of when to terminate the generator motor 30 speed control command. Closed-loop control can generate a speed error signal that is used to adjust the generator motor 30 torque. The speed error signal will be zero or negative when the transmission 60 up-shift reaches the end of the torque transfer phase. The closed-loop control can also be configured to only output positive or zero values. When so configured, the closed-loop control effectively clips outputs that would result in negative generator motor 30 torque to zero. Thus, the generator motor 30 can only increase the engine 24 rotational velocity. This type of control is referred to as uni-direction speed control. Uni-directional speed control is not available in other types of control systems, namely, dashpot controls, known in the art. Other forms of closed-loop control are also known in the art.

The strategy can also operate in open-loop control. Look up tables can be used to generate the generator motor 30 speed control command. Another form of open-loop control can include generating the generator motor 30 speed control command from a transmission 60 rotational velocity signal. Other forms of open-loop control are also known in the art.

The strategy ends at step 110.

Figure 3:
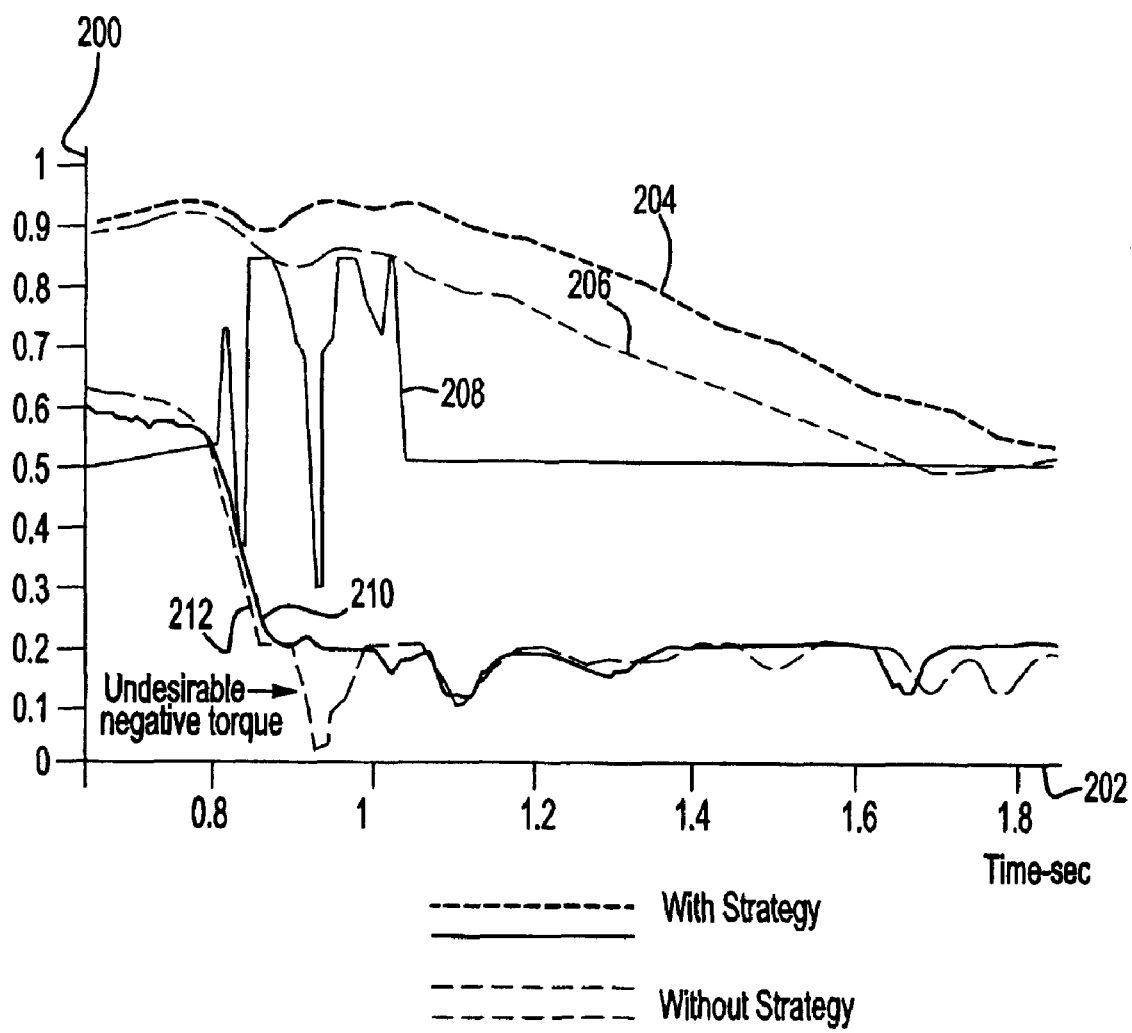
FIG. 3 illustrates in graphical form the desired performance of the strategy illustrated in FIG. 2 and a comparison thereof to performance without use of the strategy.

FIG. 3 illustrates in graphical form the desired performance of the strategy illustrated in FIG. 2 and a comparison thereof to performance without use of the strategy. The graph plots various vehicle performance values, such as engine 24 rotational velocity, generator motor 30 torque, and output shaft 44 torque, as a function of time for an event where a throttle is backed out from 30% to 0% and the transmission 60 up-shifts from a first gear to a second gear. A vertical axis 200 shows normalized values, ranging from zero (0) to one (1) for engine speed, generator motor 30 torque and output shaft 44 torque. A horizontal axis 202 represents time in seconds.

Engine speed plot lines 204 and 206 show engine 24 rotational velocities as a function of time. The engine speed plot line 204 shows engine 24 rotational velocity with the strategy shown in FIG. 2 and described above activated. The engine speed plot line 206 shows engine 24 rotational velocities without the strategy. The engine speed plot lines 204 and 206 show engine 24 rotational velocities remain greater with the strategy active.

A generator motor torque plot line 208 shows generator motor 30 torque as a function of time with the strategy shown in FIG. 2 and described above activated.

During the time period from about 0.8 second to about 1.1 seconds, the generator motor 30 applies alternating positive and negative torque to the system to maintain engine 24 rotational velocity, described above, and output shaft 44 torque, described below, at desired levels.

Output shaft torque plot lines 210 and 212 show output shaft 44 torque as a function of time. The output shaft torque plot line 210 shows output shaft 44 torque with the strategy shown in FIG. 2 and described above activated. The output shaft torque plot line 212 shows output shaft 44 torques without the strategy. The output shaft torque plot lines 210 and 212 show, at about 0.9 seconds, an elimination of an undesirable negative torque spike when the strategy is active.

The above-described embodiment of the invention is provided purely for purposes of example. Many other variations, modifications, and applications of the invention may be made.

What is claimed is:

1. A hybrid motor vehicle having an engine and a generator motor and being driven via a transmission having a plurality of gear ratios, selectively using said engine and said motor as power sources, comprising:

said generator motor operatively connected to said engine;

a controller adapted to control said generator motor;

detectors providing vehicle system input data to said controller representing data for a rotational velocity of said engine and data for a gear ratio of said transmission; and said controller being programmed to command said generator motor to maintain the rotational velocity of said engine above a preselected threshold during up-shifting of said transmission.

2. A vehicle according to claim 1, wherein said controller is programmed to operate in a closed loop mode.

3. A vehicle according to claim 1, wherein said controller is programmed to operate in an open loop mode using look-up tables.

4. The vehicle according to claim 1, wherein said vehicle system input data further comprises:

throttle position data;

vehicle speed data; and generator motor rotational velocity data.

5. A method of operating a hybrid motor vehicle having an engine and a generator motor, said vehicle driven via a transmission having a plurality of gear ratios and selectively using said engine and said motor as power sources, said vehicle further comprising a generator motor operatively connected to said engine, a controller adapted to control said generator motor, detectors providing system input data to said controller representing data for a rotational velocity of said engine and data for a gear ratio of said transmission, said method comprising the steps of:

monitoring and processing the vehicle system input data regarding data for an engine rotational velocity and data for a gear ratio of said transmission to cause said controller to monitor up-shifting of said transmission; and commanding said generator motor to maintain the rotational velocity of said engine above a preselected threshold during the up-shifting of said transmission thereby minimizing negative torque deceleration of said vehicle.

6. A method according to claim 5, wherein said controller is programmed to operate in a closed loop mode.

7. A method according to claim 5, wherein said controller is programmed to operate in an open loop mode using look-up tables.

8. The method according to claim 5, wherein said vehicle system input data further comprises:

throttle position data;

vehicle speed data; and generator motor rotational velocity data.

9. An article of manufacture, comprising:

a computer readable storage device; and a plurality of strategies in computer readable format embodied in said computer readable storage device for directing a computer to control the steps of monitoring and processing vehicle system input data regarding an engine rotational velocity and a gear ratio of a transmission to cause said computer to monitor up-shifting of said transmission, and commanding a generator motor to maintain the rotational velocity of said engine above a preselected threshold during the up-shifting of said transmission thereby minimizing negative torque deceleration of a vehicle.

10. The article of manufacture according to claim 9, wherein said vehicle system input data further comprises:

throttle position data;

vehicle speed data; and generator motor rotational velocity data.

11. A system for controlling engine rotational velocity during transmission up-shifts in an hybrid motor vehicle having an engine and a motor and being driven via a transmission having a plurality of gear ratios, selectively using said engine and said motor as power sources, comprising:

a generator motor operatively connected to said engine;

a controller adapted to control said generator motor;

detectors providing vehicle system input data to said controller representing a rotational velocity of said engine and a gear ratio of said transmission; and said controller being programmed to command said generator motor to maintain the rotational velocity of said engine above a preselected threshold during up-shifting of said transmission.

12. A system according to claim 8, wherein said controller is programmed to operate in a closed loop mode.

13. A system according to claim 8, wherein said controller is programmed to operate in an open loop mode using look-up tables.

14. The system according to claim 9, wherein said vehicle system input data further comprises:

throttle position data;

vehicle speed data; and generator motor rotational velocity data.

* * * * *